May 12, 1964  T. R. FOLSOM ETAL  3,132,917
DELAYED STARTING AND STOPPING DEVICE FOR CHART RECORDER
Original Filed Nov. 21, 1957  2 Sheets-Sheet 1

INVENTOR.
THEODORE R. FOLSOM
JOHN D. ISAACS

May 12, 1964     T. R. FOLSOM ETAL     3,132,917
DELAYED STARTING AND STOPPING DEVICE FOR CHART RECORDER
Original Filed Nov. 21, 1957     2 Sheets-Sheet 2

INVENTOR.
THEODORE R. FOLSOM
JOHN D. ISAACS

United States Patent Office 3,132,917
Patented May 12, 1964

3,132,917
DELAYED STARTING AND STOPPING DEVICE
FOR CHART RECORDER
Theodore R. Folsom, La Jolla, and John D. Isaacs,
Rancho, Calif., assignors to The Regents of the University of California, a corporation of California
Continuation of application Ser. No. 697,821, Nov. 21,
1957. This application Oct. 27, 1961, Ser. No. 149,147
10 Claims. (Cl. 346—121)

This application is a continuation of our copending application Serial Number 697,821, filed November 21, 1957, now abandoned.

This invention relates to improvements in instruments used for recording information on a moving chart with a pen, pencil or stylus and commonly called chart recorders and more particularly relates to novel means for expanding the usefulness of information recorders of a type sold in large numbers for industrial and scientific applications and commonly called circular-chart recorders and has for its object improved means for automatically starting the recording on an instrument of this common type using a circular disk chart at a desired time and for automatically terminating the record at a later time so as to produce a more clear and more useful record during the intervening period.

A further objective of this invention is to provide novel accessory means for adapting already manufactured circular-chart recorders, of a type now used in large numbers, so that good records can be made at any delayed time interval when information is most desired.

A further objective of this invention is to provide novel accessory means for causing the motor or clock now provided for rotating the circular chart disk to effect at the proper times the starting and stopping of the graph without resorting to the use of a separate timing motor or clock.

A further and more particular objective is to show simple mechanical provisions for restraining the stylus (pen or pencil) so that it can contact and travel freely over the circular chart only at a chosen time interval which may be delayed and controlled at will through simple mechanical adjustments or through changes of simple accessory parts and by the making of minor adjustments.

A further objective is to provide simple means for restraining the stylus arm of a common circular chart recorder so that it has no freedom to contact and move radially over the chart until rotation of that shaft driving the chart releases this restraint by turning a timing cam or similar member.

A further objective is to provide novel accessories which may be easily attached to the common circular pen recorders so that the chart drive motor or clock may be used to time the release of the pen arm so that a record will be traced for a limited period only.

And it is the intention to show how simple, cheap, easily stocked, accessories of novel concept can be constructed so they may be quickly attached to a common disk-type recorder with simple tools (or with no tools at all) so as to provide for the delayed recording of the type already described. These time-delaying accessories may be applied to existing recorders even those already mounted on the wall and in use. Or the customer may elect this delaying feature in specifying and ordering a new recorder; it is common practice for the manufacturer to standardize chart sizes, pen arms, and instrument frames and housings; but for him to permit the widest possible choice of simple modifications and accessories for adapting his recorder to the numerous measurements now made in industry.

A circular chart recorder can easily and cheaply be made to revolve its chart many times, but, except on certain fortunate occasions, the lines traced during the second and later revolutions are apt to cross and confuse one another; for clearest records resort is made at using only one or two revolutions. If these are made rapidly then the duration of record must necessarily be short and if important information is to be recorded provision must be made for starting the recording at the proper interval. It is often inconvenient, expensive, or even dangerous for a human operator to be present during this time interval so as to manually start and stop the recording. A simple industrial example is the recording by day-shift personnel of certain pressure surges occurring in a tank between midnight and one o'clock. Other more spectacular needs have occurred for delayed starting of simple circular chart recorders.

With these and other objectives in view, this invention consists of the novel construction, combination, and arrangement of elements and portions, as will be fully described here in the specifications, particularly pointed out in the claims, and illustrated in the drawings which form a material part of this disclosure, and in which:

Figure 1:
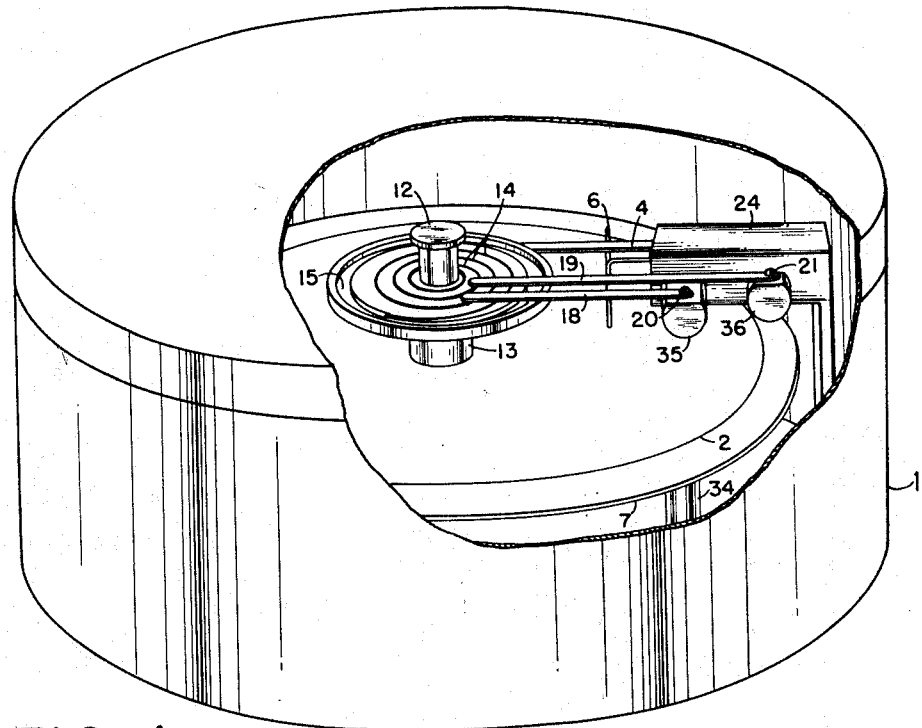
FIGURE 1 is an isometric view of the preferred embodiment of the invention.

Referring to drawings, 1 designates the case of a common type of recording instrument; 2 designates the usual circular chart disk of paper or other sheet material upon which the record is to be traced; and 3 designates the usual pen or marking stylus making the trace with ink, pencil, or by other means; 4 indicates the customary pen arm which swings around pivot 5 in response to the information to be recorded through use of linkages and members well known in the art. It is customary to make the pen arm 4 flexible so that the arm may be bent away from the chart when desired by manually raising a lifting bar 6 or by automatic means more complicated and expensive and less useful than are to be described here as examples of the present invention. It is customary to support the circular chart by means of a smooth chart table 7, and to drive the chart by clamping it to a shoulder 8 on a centrally located chart driving shaft 9 driven by a suitable clock or other motor 10.

Figure 5:
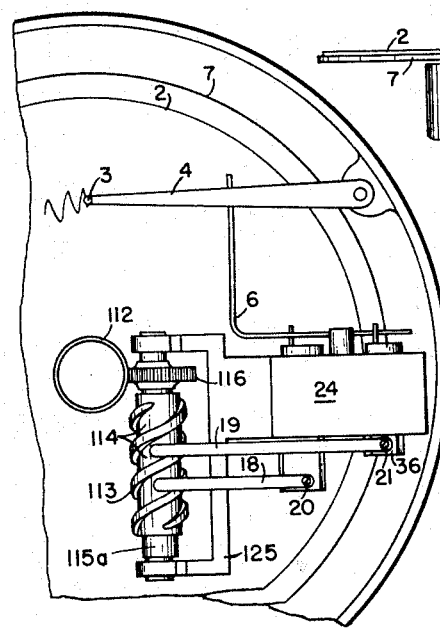
FIGURE 5 is a fragmentary top plan view of an additional embodiment.
Figure 2:
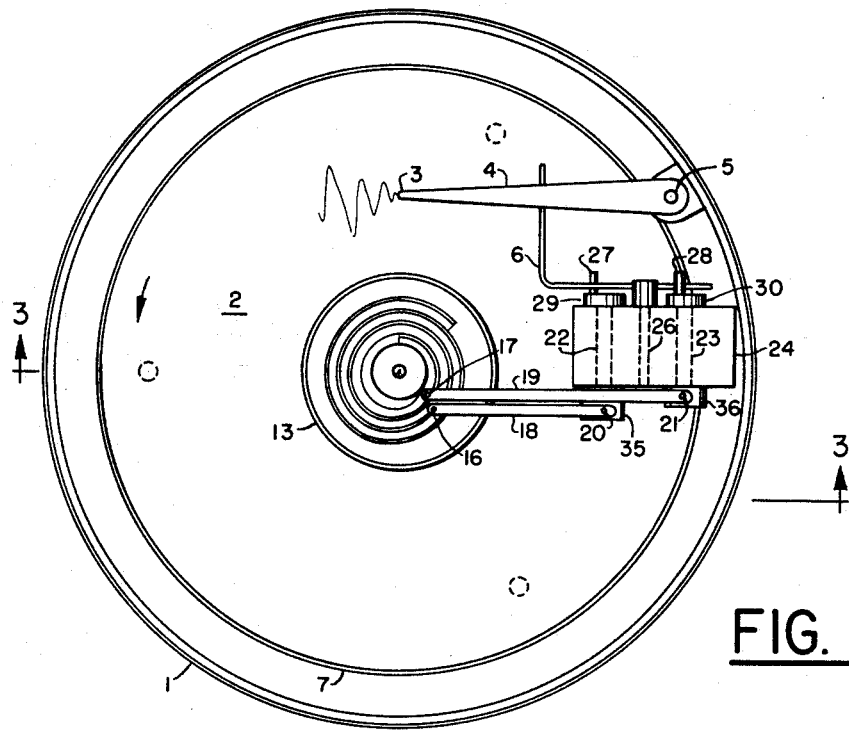
FIGURE 2 is a top plan view of FIGURE 1.
Figure 3:
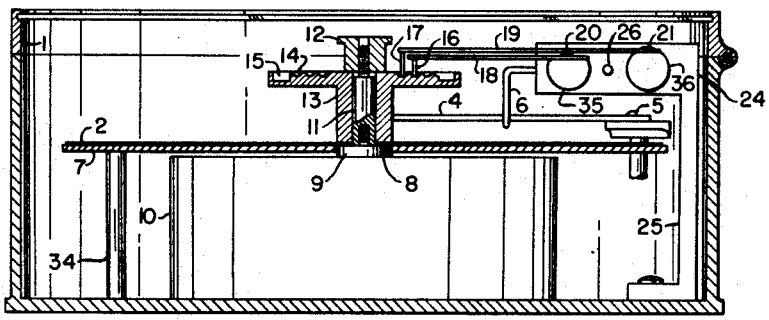
FIGURE 3 is a cross section of FIGURE 2 taken along lines 3—3 thereof.

In the present invention the shaft 9 is extended by suitable accessory means such as by the doubly threaded shaft 11, and nut 12, so that a suitable timing cam, such as scroll cam 13 in FIGURE 2 or helical cam 113 in FIGURE 5, can be driven at controlled speed by the clock shaft which turns the chart. In the present invention the pressure of nut 12 may be made to clamp the paper to the shouldered drive shaft in the simple manner shown on FIGURE 2, or with aid of intervening members such as washers. It will be seen that chart and cam may be independently rotated so as to be desirably orientated initially before nut 12 is tightened; after tightening nut 12 the chart and cam will rotate in unison.

In that embodiment of this invention shown in FIGURES 1, 2, 3 and 4 a very simple scroll cam is employed whose upper surface has a groove 14 (or several double pitch grooves) spiralling outward and terminating in a circular trough 15 whose bottom is deeper below the top of the scroll plate than is the bottom of the spiral groove. The sense of the spiral is such that when the chart, and scroll rotate a needle fitted into a groove and restrained to move only radially will move outward and fall or be pulled by spring action into the deeper, terminal circular trough. The time of arrival of an engaged needle at the terminal groove can therefore be controlled by electing a suitable pitch and terminal radius for the scroll and by selecting suitable starting radius for the timing needle. FIGURES 1, 2, 3 and 4 show two timing needles 16 and 17 spaced (for example) one groove radially apart and constrained by stiff needle supporting arms 18 and 19 respectively so as to move radially about needle arm pivots 20 and 21, respectively. Rotation of the chart will therefore be accompanied by the delayed arrival of the needles 16 and 17 at the terminal trough 15; and the arms 18 and 19 both will ultimately drop downward in a substantially vertical plane toward the chart, arm 19 dropping later than arm 18 by the time required for one revolution of the spiral groove 14. For example, if the spiral revolved once per hour the arms would drop one hour apart and a delayed record of just one hour's length (one revolution) would be made.

The downward motions toward the chart of the arms 18 and 19 cause first the start and then the termination of the record by causing the tracing pen 3 to be first lowered into contact with the chart 2 and later after the desired recording interval to be raised out of contact. A complete example of simple mechanical linkages is shown in FIGURES 1, 2, 3 and 4 wherein two rotatable parallel shafts 22 and 23 are supported by a bearing block 24 supported in turn by a bracket member 25 which is attached rigidly to the instrument case 1. Suitable hub enlargements are attached to and rotate with both ends of each shaft just mentioned; through hub 35 on one end of shaft 22 and at right angles to the axis of this shaft is drilled a close fitting bearing hole for pivot 20 to turn within. A similar hole is drilled for pivot 21 in hub 36 on one end of shaft 23. The needles are thus unconstrained radially by this pivot mounting, but the dropping of either arm causes rotation of that shaft attached to it.

Figure 4:
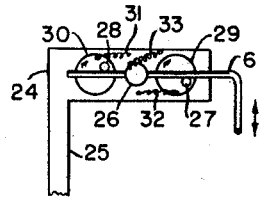
FIGURE 4 is a detail of the bearing block, of the pen arm support, and of the crank pens.

In the example embodiments illustrated, the pen-lifting bar 6 is supported by shaft 26 which shaft turns freely and is supported in a bearing hold in block 24. The pen-lifting bar 6 is bent and shaped and attached to its shaft as shown in FIGURES 1, 2, 3 and 4 so that it will be contacted by crank pins 27 and 28 which are fixed in crank hubs 29 and 30, respectively. As best shown in FIGURES 2 and 4, the dropping of needle 16 causes rotation of pin 27 so as to permit the dropping of the pen-lifting bar, while the dropping of needle 17 causes pin 28 to move so as to lift the pen-lifting bar, the bar being in the pen-lowered position as shown in FIGURE 4.

Tensional springs 31, 32 and 33, acting as shown against small pins in the hubs and bearing block, cause the actual shaft rotations and serve to overcome gravitational pulls so that the effect will be same whether the instrument is mounted against a wall or lying flat upon a table. Obviously spring 31 must be stiffer than spring 33, and the crank pins must be located such that:

A. Both needles in timing grooves will cause the pen to be away from the paper, and B. Needle 16 in the circular trough, but needle 17 still in the groove will cause the lifting bar 6 to lower enough for the pen arm 4 to clear it, and C. Both needles in trough 15 will cause the pen to lift again by the action of spring 31 and pin 28.

Now it will be clear that with suitably chosen pitch of scroll groove and with suitable pivotal movement in a horizontal plane of arms 18 and 19, needles 16 and 17 may be selectively located at various points along the scroll groove so that the record may be automatically started and terminated at the desired delayed times.

Figure 6:
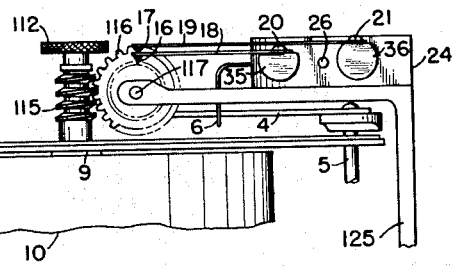
FIGURE 6 is an elevational view of FIGURE 5.

The embodiment of this invention illustrated in FIGURES 5 and 6, is included in this disclosure to show that this invention is not limited to the use of a timing cam of the form of a scroll having a spiral groove, but may take other forms such as for example the form of a helical groove 114 cut into a cam cylinder 113, which is provided also with a deeper terminal groove 115a into which timing needles 17 and 18 may drop so as to actuate the pins, arms and other linking means already illustrated for raising and lowering the tracing pen.

In FIGURES 5 and 6 this helical timing groove is illustrated as being rotated by the chart-driving shaft through a worm 115 and worm gear 116 and the figures illustrate how these accessories are attached by extending the usual chart driving shaft or shaft hub. Clamping nut 112 in this embodiment may be used to lock the timing cam 113 into synchronism with the chart and chart-drive shaft after the desired relative starting rotations are elected by freely rotating the worm 115. To change paper only the worm 115 and the nut 112 have to be removed in the particular example illustrated in FIGURE 5 and FIGURE 6 but now the bracket 125 must extend as shown so as to support a shaft 117 around which helical cam 113 can rotate. One advantage in construction is the small size of parts required and the fine timing resolution which is possible. Timing rates and displacements may be changed widely by electing different gears and pitches of screws and helices.

Obviously in the embodiment as illustrated by FIGURES 5 and 6 as examples of this invention the worm and worm gears linking the timing cam to the chart and chart drive shaft might in some cases be preferably replaced by a pair of mitre gears, a pair of bevelled gears, or a pair of helical gears. In fact, the election of any of these drive combinations or others should depend upon what amount and accuracy of automatic delay in time is required for the particular recording job for which the present invention is to be utilized.

In both embodiments the delays and recording intervals can most accurately be selected if the angular and radial positions of the needles in the grooves are indicated by numbered marking lines or marks, for example if each revolution of the scroll of FIGURE 2 takes one hour then 60 equally spaced dial lines engraved upon the scroll rim would disclose to the minute, by comparison with a fixed pointer, the amount of time delay remaining before starting or stopping of the record will take place. And this information would be evident at any time.

Although only two embodiments of this invention have been described in complete detail, and although only a few modifications have been pointed out, it will be apparent to those skilled in the art from what has been described that many other modifications may be made without departing from the spirit of the invention or from the scope of the appended claims. For example, description has been made of simple means for removal of the stylus from contact with the chart by bending upward a flexible pen arm; it is apparent that alternatively the stylus may be constrained, when no record is desired, to a suitable radial position where no confusing mark on the chart face is possible; a pen for example can be constrained to draw a fixed circle say at the chart rim until it is freed for recording.

We claim:

1. In combination with
   (A) a chart recorder
      (a) having a circular chart rotatable by a drive shaft,
      (b) drive means for rotating the drive shaft,
      (c) and a stylus arm movable toward and away from the face of the chart to effect engagement and disengagement, respectively, of the stylus and the chart face;
   (B) a timing device comprising:
      (a) a rotatable timing cam
      (b) and having a track in the form of a threaded worm, the track being defined by the threads of the worm,
      (c) said track being provided with a terminal section;
   (C) gear reduction means connected between the drive shaft and the timing cam whereby the rate of rotation of the threaded worm is substantially less than the rate of rotation of the drive shaft;
(D) supporting means carried by the chart recorder;
(E) two elongated cam followers, each having one end engageable with said track and mounted independently of one another to said support means for independent pivotal movement
    (a) in a first plane toward and away from said track,
    (b) and for movement in a second plane for engaging said track at one of a plurality of points along the length of said track,
    (c) said cam followers being moved in said first plane upon engagement with said terminal section;
(F) and means coupling said cam followers to the stylus arm whereby movement of said cam followers in said first plane effects movement of said stylus with respect to the chart face.

2. In combination with
(A) a chart recorder
    (a) having a circular chart rotatable by a drive shaft,
    (b) drive means for rotating the drive shaft,
    (c) and a stylus arm movable toward and away from the face of the chart to effect engagement and disengagement, respectively, of the stylus and the chart face;
(B) a timing device comprising:
    (a) a rotatable timing cam positioned outwardly from the chart
    (b) and having a track
    (c) provided with a terminal section;
(C) means coupling said timing cam to the drive shaft of the chart recorder whereby said timing cam is rotated outwardly of said chart face by the drive shaft;
(D) support means carried by the chart recorder;
(E) a first elongated cam follower and
(F) a second elongated cam follower
    (a) each of said cam followers being engageable at one end with said track
    (b) and each being independently mounted to said support means for pivotal movement
    (c) in a first plane toward and away from said track,
    (d) and for movement in a second plane for engaging said track at one of a plurality of points along the length of the track,
    (e) said first and second cam followers each being moved in said first plane upon engagement with said terminal section;
(G) and means coupling said first and second cam followers to the stylus arm whereby movement of said first cam follower in said first plane effects engagement of the stylus with the chart face and movement of said second cam follower effects disengagement of the stylus with the chart face.

3. In combination with
(A) a chart recorder
    (a) having a circular chart rotatable by a drive shaft,
    (b) drive means for rotating the drive shaft,
    (c) and a stylus arm movable toward and away from the face of the chart to effect engagement and disengagement, respectively, of the stylus and the chart face;
(B) a timing device comprising:
    (a) a rotatable timing cam positioned outwardly from the chart
    (b) and having a track
    (c) provided with a terminal section;
(C) means coupling said timing cam to the drive shaft of the chart recorder whereby said timing cam is rotated outwardly from said chart face by the drive shaft;
(D) support means carried by the chart recorder;
    (a) said support means including a pair of spaced apart pivotable elements
    (b) having a first pin
    (c) and a second pin, respectively;
(E) a first elongated cam follower
(F) and a second elongated cam follower,
    (a) each of which is engageable at one end with said track and is mounted to said pivotable elements, respectively,
    (b) for pivotal movement in a first plane for engaging said track at one of a plurality of points along the length of said track,
    (c) said first and second cam followers each being movable in said first plane upon engagement with said terminal section;
(G) and a bar pivotally mounted on said support means between said pivotal elements,
    (a) extending on opposite sides of said first pin and said second pin,
    (b) and formed to extend to a position closely adjacent the stylus arm whereby movement of said first cam follower in said first plane effects engagement of said first pin with said bar to move said stylus in one direction, and movement of said second cam follower in said first plane effects engagement of said second pin with said bar to move said stylus in the opposite direction.

4. In combination with
(A) a chart recorder
    (a) having a circular chart rotatable by a drive shaft,
    (b) drive means for rotating the drive shaft,
    (c) and a stylus movable toward and away from the face of the chart to effect engagement and disengagement, respectively, of the stylus and the chart face;
(B) a timing device comprising:
    (a) a rotatable timing cam positioned outwardly from the chart
    (b) and having a track
    (c) provided with a terminal section;
(C) means coupling said timing cam to the drive shaft of the chart recorder whereby said timing cam is rotated outwardly of said chart face by the drive shaft;
(D) support means carried by the chart recorder;
(E) a first cam follower and
(F) a second cam follower
    (a) each of said cam followers being engageable with said track
    (b) and each being independently mounted to said support means for pivotal movement
    (c) in a first plane toward and away from said track,
    (d) and for movement in a second plane for engaging said track at one of a plurality of points along the length of the track,
    (e) said first and second cam followers each being moved in said first plane upon engagement with said terminal section;
(G) and means coupling said first and second cam followers to the stylus whereby movement of said first cam followers in said first plane effects engagement of the stylus with the chart face and movement of said second cam follower effects disengagement of the stylus with the chart face.

5. A chart recorder, said recorder including:
    (a) movable means for supporting a chart,
    (b) a timing motor for moving said chart supporting means,
    (c) a stylus adapted to engage the chart,
    (d) means for supporting the stylus for pivotal movement in a path paralleling the path of movement of the chart and movable for moving the stylus toward and away from the chart (e) a plurality of cam followers connected with the stylus supporting means, (f) said cam followers being movable independently of one another, (g) said cam followers, when in certain positions, cooperating with the stylus supporting means for retaining the stylus spaced from the chart, and when one of said cam followers is moved to a certain other position, said movement causing the stylus supporting means to be moved to a position wherein the stylus contacts the chart, and when the other of said cam followers is moved from the first mentioned positions, said last mentioned movement causing the stylus supporting means to be moved to a position wherein the stylus is moved away from the chart, (h) and cam means rotatably actuated by the motor in synchronism with the rotatable chart supporting means and cooperating with the cam followers for effecting movements thereof in the order specified.

6. A chart recorder as defined in claim 5, in which the cam means consists of a single cam.

7. A chart recorder as defined in claim 5, in which the cam followers are movable in two different planes relative to one another.

8. A chart recorder for a disk type chart, said recorder including:
(a) a rotatable means for supporting a disk type chart,
(b) a timing motor for rotating said chart supporting means,
(c) a stylus adapted to engage the chart,
(d) means for supporting the stylus for pivotal movement in a plane paralleling the plane of the chart and movable for moving the stylus toward and away from the chart
(e) a plurality of cam followers connected with the stylus supporting means,
(f) said cam followers being movable independently of one another,
(g) said cam followers, when in certain positions cooperating with the stylus supporting means for retaining the stylus spaced from the chart, and when one of said cam followers is moved to a certain other position, said movement causing the stylus supporting means to be moved to a position wherein the stylus contacts the chart, and when the other of said cam followers is moved from the first mentioned positions, said last mentioned movement causing the stylus supporting means to be moved to a position wherein the stylus is moved away from the chart,
(h) and cam means rotatably actuated by the motor in synchronism with the rotatable chart supporting means and cooperating with the cam followers for effecting movements thereof in the order specified.

9. A chart recorder as defined in claim 8, in which the cam means consists of a single cam.

10. A chart recorder as defined in claim 8, in which the cam followers are movable in two different planes relative to one another.

References Cited in the file of this patent

UNITED STATES PATENTS 2,501,604    Jordan _____ Mar. 21, 1950